(12) United States Patent
Hirayama et al.

(10) Patent No.: US 7,215,612 B2
(45) Date of Patent: May 8, 2007

(54) DISK RECORDING APPARATUS AND DISK RECORDING METHOD

(75) Inventors: Hiroshi Hirayama, Yokohama (JP); Takahiro Sunada, Fujisawa (JP); Takehiko Sekine, Yokohama (JP)

(73) Assignees: Hitachi, Ltd., Tokyo (JP); Hitachi-LG Storage, Inc., Tokyo (JP)

( * ) Notice: Subject to any disclaimer, the term of this patent is extended or adjusted under 35 U.S.C. 154(b) by 530 days.

(21) Appl. No.: 10/632,004

(22) Filed: Jul. 30, 2003

(65) Prior Publication Data

US 2005/0025006 A1    Feb. 3, 2005

(51) Int. Cl.
*G11B 7/00* (2006.01)
(52) U.S. Cl. .................. 369/47.22; 369/47.27
(58) Field of Classification Search ............. 369/275.3, 369/47.28, 47.1, 47.22, 47.13, 47.19, 47.27, 369/44.13, 47.31
See application file for complete search history.

(56) References Cited

U.S. PATENT DOCUMENTS 6,266,318 B1 * 7/2001 Honda et al. ............ 369/275.3

6,754,149 B2 * 6/2004 Morikawa et al. ....... 369/47.31

FOREIGN PATENT DOCUMENTS

| JP | 10-112127 A | 4/1998 | |
| JP | 2001-110061 | 4/2001 | |
| JP | 2001-184655 | 7/2001 | |
| JP | 2002-050109 A | 2/2002 | |
| JP | 2002-109750 | * 4/2002 | ............... 369/47.1 |

* cited by examiner

*Primary Examiner*—Nabil Hindi
(74) *Attorney, Agent, or Firm*—Townsend and Townsend and Crew LLP

(57) ABSTRACT

The disk recording apparatus and method are arranged to specify a recording address and a recording position on an optical disk with a wobble PM (phase modulation) format through the use of a wobble reproduced signal and a track reproduced signal. The recording apparatus operates to detect address information and a synchronous signal on the optical disk that correspond with the wobble reproduced signal and the track reproduced signal sent from the optical disk respectively. Then, the address information required for specifying a disk recording track and the synchronizing timing required for specifying a linking position are selected from the detected states.

4 Claims, 7 Drawing Sheets

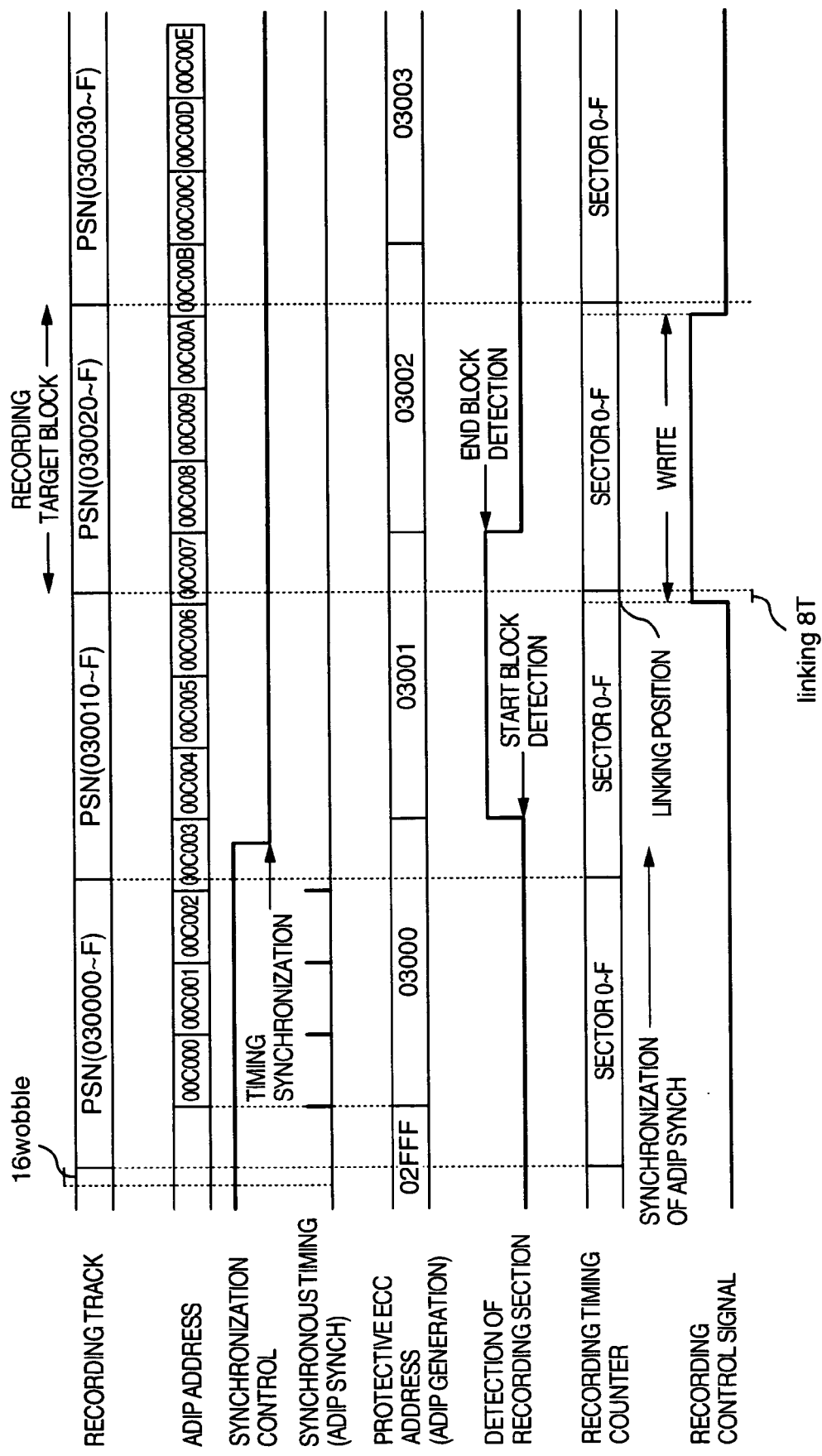

DISK RECORDING APPARATUS AND DISK RECORDING METHOD

BACKGROUND OF THE INVENTION

The present invention relates to a disk recording method and a disk recording apparatus, and more particularly to the disk recording method and apparatus which are required when information is linked or rewritten onto an optical recording disk.

As a typical large-volume disk-type recording medium, a DVD (Digital Versatile Disc) may be referred. Further, as an information-recordable medium, recently, a write-once-read-many DVD-R or DVD+R and a rewritable DVD-RW or DVD+RW have been developed. These kinds of disks include wobbles formed on the side of each recording track on the disk and pits (land pre-pits) marked on the disk surface. For the purpose of specifying a recording position (track) on the disk, the data composed of a synchronous signal, address information and additional information is modulated and recorded on those wobbles and pits.

As the method of modulating the synchronous signal, the address information and the additional information, as disclosed in JP-A-2001-110061, a LPP (Land Pre-Pit) format and a wobble PM (Phase Modulation) may be referred. The LPP format is used for the DVD-R and DVD-RW disk and the PM format is used for the DVD+R and DVD+RW.

Herein, the PM format will be described with reference to FIGS. 2A to 2C. FIGS. 2A to 2C illustrate one example of the PM format. FIG. 2A shows the wobble PM method. FIG. 2B shows an ADIP (Address In Pre-groove) word composition that is a component unit of the information to be wobble-phase-modulated, the relation between one ECC block period, which corresponds to the data recording unit of the DVD and the number of ADIP words included in the ECC block period, and a frame composition within one sector that is a component unit of the ECC block. FIG. 2C shows the block-by-block rewriting and linking methods, which are executed on the recording track.

In FIG. 2A, each wobble phase-modulated portion is inverted 180 degrees in phase. In a group of 93 wobbles, an ADIP synch that is located at the head of the ADIP word, a bit synch that is located at the head of each data bit, and a data bit are separated at appearing intervals of the phase-modulated portions. Concretely, the ADIP synch appears at each four-wobble interval, the bit synch appears at each one-wobble interval, and a data bit appears at each two-wobble interval. O data is separated from 1 data based on the difference of the appearing interval between the bit synch and the data bit.

In FIG. 2B, the ADIP word is composed of 52 bits, concretely, an ADIP address, an AUX (Auxiliary) data, and an error-correcting code. The ADIP address is composed of three bytes, that is, data 0 (=0 fixed) and data 1 to 23, the data 0 being matched to the head ADIP synch. The AUX data is composed of one byte, that is, data 24 to 31. The error-correcting code is composed of data 32 to 51, that is, 2.5 bytes, and is used for correcting an error contained in the restored ADIP word. On the other hand, the ECC block period, which corresponds to the disk recording unit, is composed to have four ADIP words, for securing the reliability of access to a target ECC block. Then, the composition of the ECC block will be described. The ECC block is composed of 16 sectors, which corresponds to the access unit in reproduction, a synchronous signal, which corresponds to the synchronous unit to a data volume of one sector in reproduction, and 26 frames each of which is composed of modulated data. One frame is composed of 1488T data volume (in which T is a channel bit that is the basic unit of the recording mark length on the disk, and T=26.16 MHz). The head frame of one sector includes a frame synchronous signal SY0 that indicates the sector head and a data portion ID located thereafter, the data portion ID being used for specifying the track position in reproducing the data from the disk.

In FIG. 2C, the linking method is executed to add dummy data of 8T before the ECC block including the recording information, start to record the dummy data from the linking position of the previous ECC block end 8T (that matches to the seventeenth wobble), and stop the recording at the linking position of the ECC block end 8T where the recording is to be ended (that matches to the seventeenth wobble), for executing the block-by-block rewrite and link recording. The linking position is specified by detecting the wobble-phase-modulated ADIP synch, data bit, the ADIP address information, and so forth.

SUMMARY OF THE INVENTION

Today, various kinds of write-once-read-many and rewritable disks such as DVD+R and DVD+RW are commercially made available. When rewriting or linking information on these disks, it is necessary to specify the reproducing wobble position, that is, the linking position by detecting the modulated address information for specifying a track position on the disk and also the modulated synchronous signal.

Hence, the defects such as the dust adhering to the disk and the flaw of the disk may become an obstacle to detecting the modulated synchronous signal or the like, thereby making the address detecting ratio lower and bringing about an adverse effect on specifying the accurate linking position. In the worst case, this results in shifting the linking position in recording the data.

If the data is recorded on the disk in the above described state, the information may be recorded on the different track from the target track, which may leads to breaking the recorded data. Further, since the information is recorded in the wrong linking position, when reproducing the data, the ECC block data may be partially broken near the linking position, which may also leads to the burst error occurrence, thereby possibly making the reproduction disabled.

Under these circumstances, the disk recording apparatus is required to rewrite and link the information even on the disk having the defect as specifying the track position by detecting the address as well as specifying the linking position with precision.

It is therefore an object of the present invention to provide the disk recording method and the disk recording apparatus which are arranged to achieve the foregoing requirement.

According to the present invention, in carrying out the foregoing object, the disk recording apparatus includes means for detecting a first synchronous signal, which is modulated into a reproducing wobble signal and indicates the head of a first data component unit, and first address information contained in the data composition, means for detecting a second synchronous signal, which is modulated into a reproducing track signal and indicates the head of the second data component unit, and second address information contained in the data composition, first means for selecting a detection timing of the first synchronous signal or a detection timing of the second synchronous signal or the second address information, second means for selecting the first or the second detecting address, and control means for specifying a linking position in synchronous to wobble positions on the disk based on the selected detecting timing sent from the first selecting means and the selected detecting address sent from the second selecting means and controlling recording of information onto a target recording track section.

Other objects, features and advantages of the invention will become apparent from the following description of the embodiments of the invention taken in conjunction with the accompanying drawings.

BRIEF DESCRIPTION OF THE DRAWINGS

FIG. 3 is a view showing a first recording method;

DETAILED DESCRIPTION OF THE EMBODIMENTS

Figure 1:
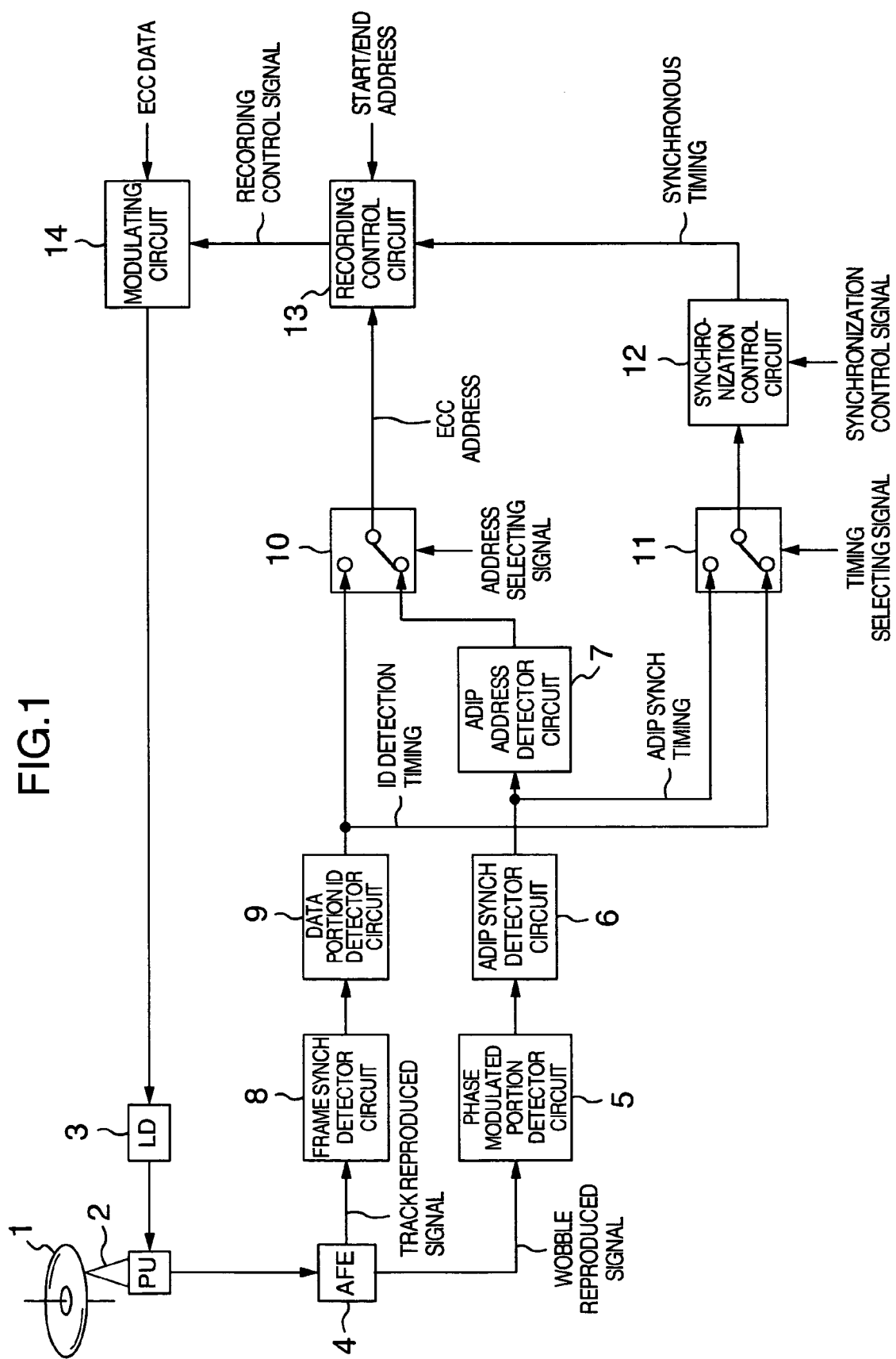
FIG. 1 is a block diagram showing a disk recording apparatus according to a first embodiment of the present invention.

Hereafter, the present invention will be described with reference to the appended drawings. In FIG. 1, a numeral 1 denotes an optical disk with a wobble PM (Phase Modulation) format. A numeral 2 denotes an optical head for recording data on the disk. A numeral 3 denotes a laser driver for generating a recording pulse from the modulated data recorded on the disk and controlling a semiconductor laser provided with the optical head in response to the generated pulse. A numeral 4 denotes an AFE (Analog Front End) for generating a difference signal from a photo detector and reproducing a wobble signal for a track on the optical disk 1 as well as a recording mark on the track in response to the difference signal. A numeral 5 denotes a phase modulated portion detector circuit for detecting a wobble phase modulated portion and generating a phase inverted period as a binary pulse of 0 and 1 based on the detected result. A numeral 6 denotes an ADIP synch detector circuit for measuring a pulse width, detecting an ADIP synch of a four-wobble width, a bit synch of a one-wobble width and a data bit of a two-wobble synch based on the measured result, and protecting an appearing period for each ADIP synch. A numeral 7 denotes an ADIP address detector circuit for specifying the head of an ADIP word from the detected ADIP synch, determining 0 or 1 data from the wobble position where the data bit appears, restoring a word composition based on the determined result, performing an error correction of the word composition, and then detecting and protecting the ADIP address. A numeral 8 denotes a frame synch detector circuit for demodulating frame data as detecting a frame synchronous signal SYO included in a track reproducing signal. A numeral 9 denotes a data portion ID detector circuit for detecting a frame synchronous signal SYO at the head of the sector, detecting a data portion ID address from the demodulated data immediately after the frame synchronous signal SYO, and protecting the data portion ID address. A numeral 10 denotes an address selector for selecting an address in each ECC block, the address being derived by excluding the lower two bits from the ADIP address obtained by the ADIP address detector circuit 7, or another address in each ECC block, the address being derived by excluding the lower four bits from the data portion ID address obtained by the data portion ID detector circuit 9. A numeral 11 denotes a timing selector for selecting an ADIP synch timing detected and protected by the ADIP synch detector circuit 6 or a data portion ID detecting timing detected by the data portion ID detector circuit 9. A numeral 12 denotes a synchronization control circuit for controlling an output on or off of the synchronous timing for the selected output from the timing selector 11. A numeral 13 denotes a recording control circuit for detecting a target track on which the data is to be recorded from the obtained ECC address and the recording start and end ECC addresses, synchronizing the detected track with the wobble positions based on the synchronizing timing, specifying the linking position based on the synchronization, and thereby generating a recording control signal for a target recording section on the optical disk. A numeral 14 denotes a modulating circuit for modulating the data to be recorded on the optical disk in each ECC block, generating the recording data suited to the disk recording such as modulating, framing and addition of a frame synchronous signal, and outputting the generated data in response to the recording control signal.

In turn, the address detection, the timing synchronization for specifying the linking position, and the recording control, which are executed in the recording apparatus shown in FIG. 1, will be exemplarily described with reference to FIGS. 3, 4 and 5.

FIG. 3 shows the first recording method based on the synchronization of the ECC address obtained from the ADIP address with the ADIP synch detection in the disk recording apparatus shown in FIG. 1. The first recording method may be applied to the recording of data onto an empty disk and the link or rewrite of data on a recorded disk.

In FIG. 3, the PSN on the recording track indicates an area of each ECC block. The PSN includes the corresponding data portion ID for 16 sectors. The PSN IDs correspond with 030000~F, 030010~F, . . . , respectively. In the ADIP address detector circuit 7, the ADIP address is defined four sectors later than the ECC recording area. The address selector 10 outputs the ECC address generated from the detected value of the ADIP address to the recording control circuit 13. The circuit 13 compares the ECC block address for the recording start with the ECC block address for the end, thereby detecting the recording sector. FIG. 3 shows the detecting operation of the recording sector for the recording start ECC address 03001 and the recording end ECC address 03002.

Figure 2A:
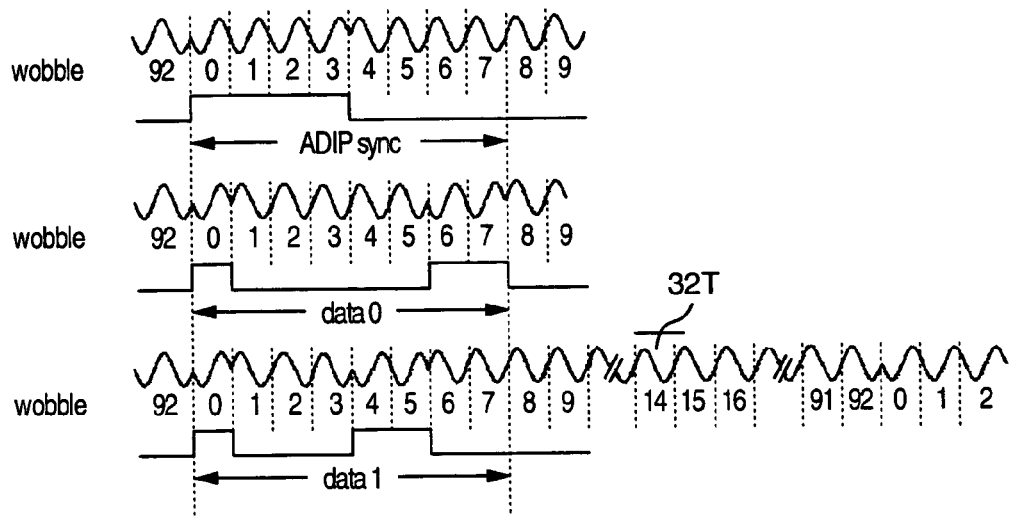
FIGS. 2A to 2C are views showing a wobble PM (phase modulation) format composition.
Figure 2B:
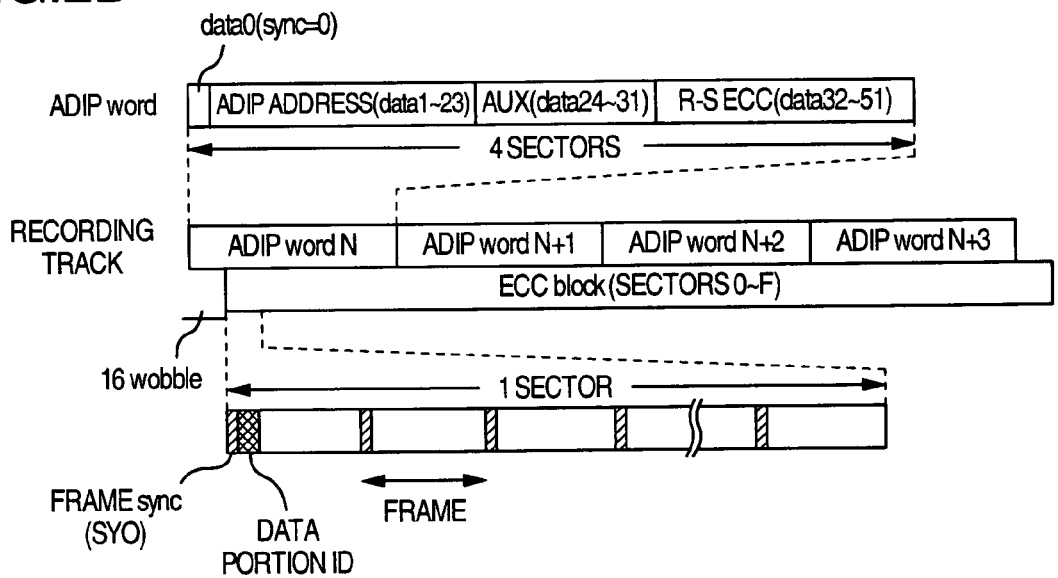
Figure 2C:
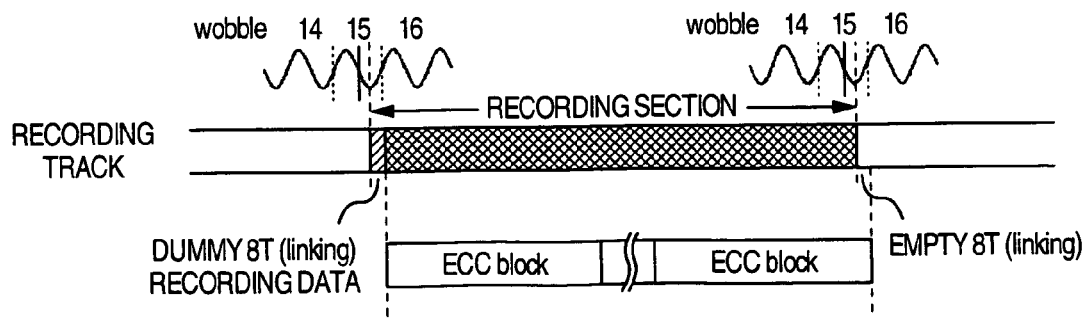

On the other hand, the ADIP synch detector circuit operates to detect the ADIP synch at a forward position by 16 wobbles to the four-sector area included in the ECC recording area. In this first recording method, the timing selector 11 outputs the ADIP synch detection timing after the period is protected. Further, the synchronization control circuit 12 outputs a synchronous timing between when the tracking on the optical disk 1 is started and when the tracking reaches the recording start ECC block. Then, the recording control circuit 13 synchronizes its synchronous timing with the recording timing counter for the purpose of synchronizing the timing counter with the wobble positions on the disk. The control circuit 13 further detects the recording section. If the recording timing counter value reaches the linking position shown in FIG. 2C, the control circuit 13 generates the recording control signal and then controls the output of the recording data to the modulating circuit 14 with the recording control signal, for controlling the recording of the data onto the optical disk 1.

Figure 4:
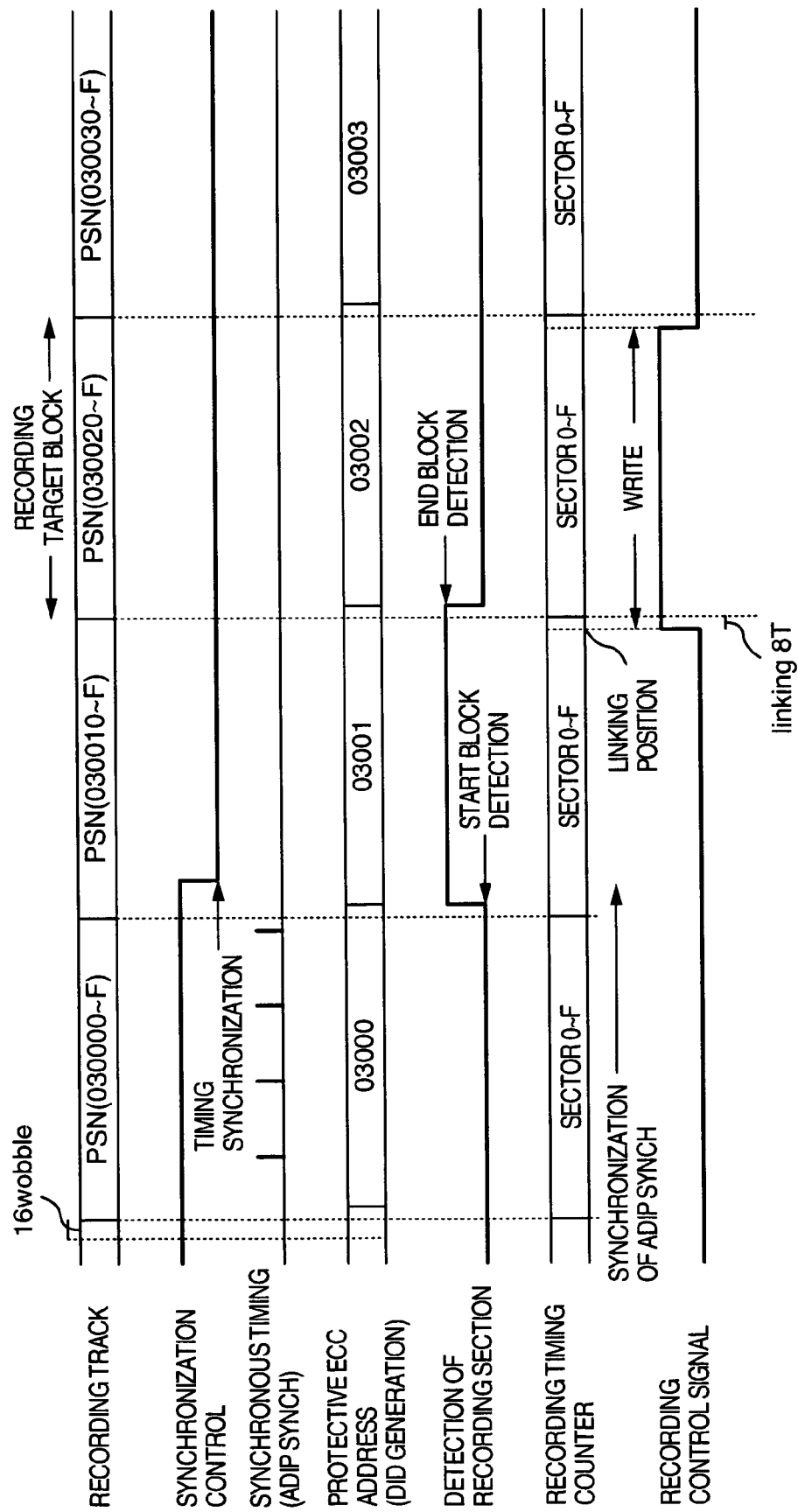
FIG. 4 is a view showing a second recording method.

FIG. 4 shows the second recording method based on the synchronization of the ECC address obtained from the data portion ID address with the ADIP synch detection in the disk recording apparatus shown in FIG. 1. This recording method is applied to the rewrite of data onto the recorded area or the link of data from the last recording position.

In FIG. 4, the data portion ID detector circuit 9 detects the data portion ID address value. In this case, as the output of the address selector 10 selected is the ECC address generated from the detected data portion ID address. The recording section is detected from the ECC address selected in the recording control circuit 13 and the ECC addresses for the recording start and end. The data portion ID may be detected only within the reproducing section of the recorded track. The obtention of the ECC addresses and the synchronization of the recording timing counter are essentially required to be executed within the sector.

On the other hand, the synchronization of the recording timing is analogous to that of the first recording method. That is, the recording timing counter is synchronized with the wobble positions on the disk on the ADIP synch timing. Later, the same control as that of the first recording method is applied to the control for recording the data onto the optical disk 1.

For the first and the second recording methods, concern may take place for the accumulation of the positional shifts of the wobbles in recording. Hence, in some cases, the synchronization control circuit does not control the output on the synchronous timing. In recording data onto the disk, the synchronization of the recording timing counter with the ADIP synch detection timing may be considered.

Further, the synchronous timing used for synchronizing the recording timing counter is not limited to only the ADIP synch. It may be the combination of the ADIP synch with the wobble MP bit synch or the detection timing of the data bit.

Figure 5:
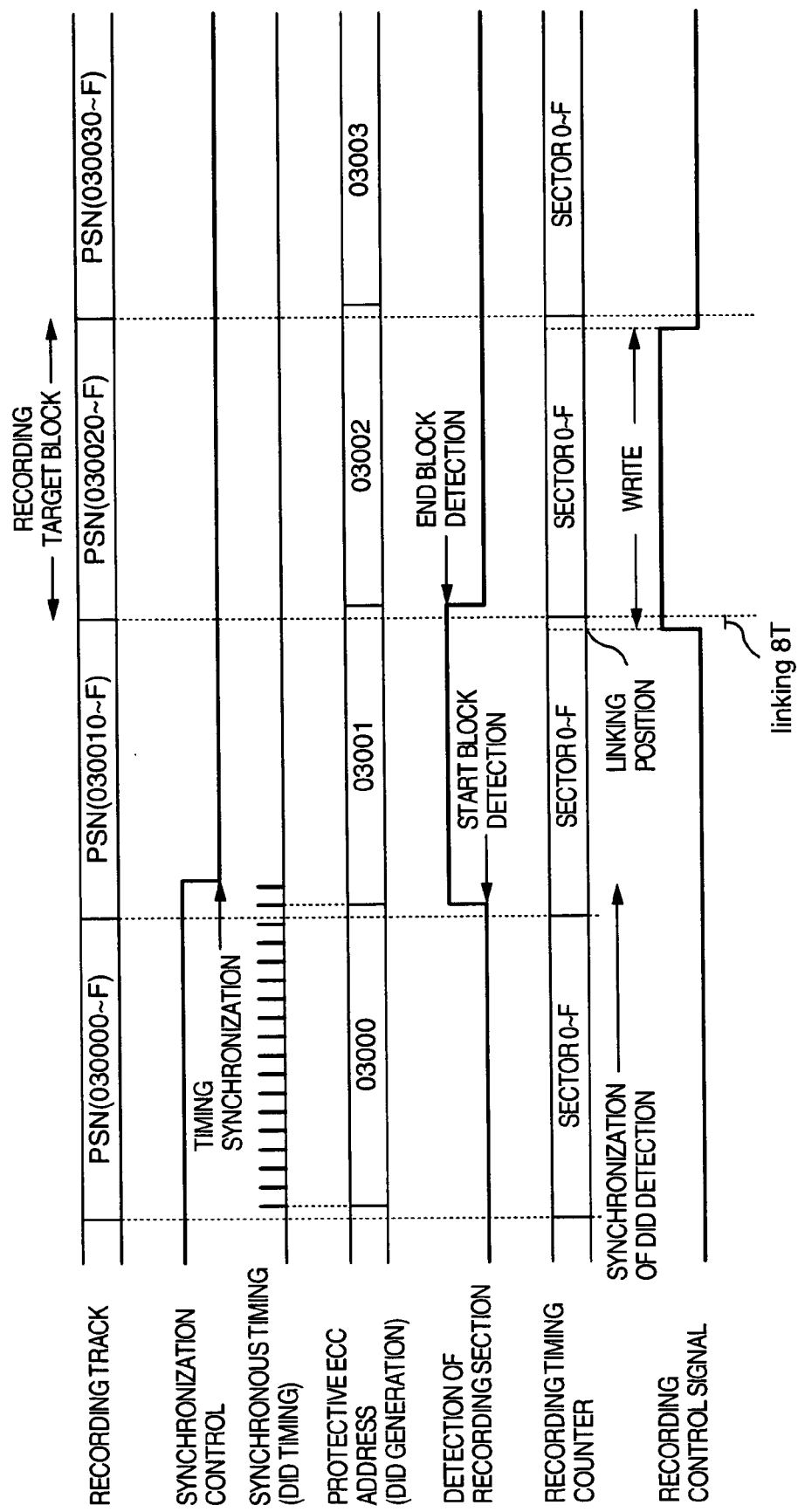
FIG. 5 is a view showing a third recording method.

FIG. 5 shows the third recording method based on the synchronization of the ECC address obtained from the data portion ID address with the data portion ID detection timing in the disk recording apparatus shown in FIG. 1. Like the second recording method, the third recording method is also applied to the rewrite of data on the recorded area or the link of data from the last recording position.

Like the second recording method, the detection of the recording sector in FIG. 5 is executed on the detected data portion ID address. On the other hand, the ID detection timing obtained from the data portion ID detector circuit 9 is detected for 16 sectors included in the ECC recording area. In this case, as the output of the timing selector 11, the detection end timing of the data portion ID is selected. Based on the selected timing, the recording timing counter is synchronized. Later, the third recording method applies the same control as the first recording method to the control for recording the data onto the optical disk 1.

The detection of the data portion ID is made possible only within the reproducing sector of the track. The obtention of the ECC address, the detection of the synchronizing timing, and the synchronization of the recording timing counter are essentially required to be executed within that sector.

In the third recording method, it is considered that the recording timing counter may be synchronized with the frame synchronous signal SY0 that indicates the sector head or another frame synchronous signal including the SY0.

Further, the timing on which the recording timing counter is synchronized is not limited to the ID detection timing obtained from the data portion ID detector circuit 9 or the detected synchronous signal of the frame with the SY0 as its start. If the wobble reproduction from the disk is made possible, the recording timing counter may be synchronized wobble by wobble, based on the binary reproducing wobble signals and their detection timings. In this case, the synchronization of the wobble positions on the disk with the recording timing counter is made more accurate. This results in specifying the linking position more accurately.

Hereafter, the description will be oriented to an example of the method for selecting one of the first to the third recording methods that are executed in the recording apparatus shown in FIG. 1. The selecting method will be described with reference to the flowchart of FIG. 6.

Figure 6:
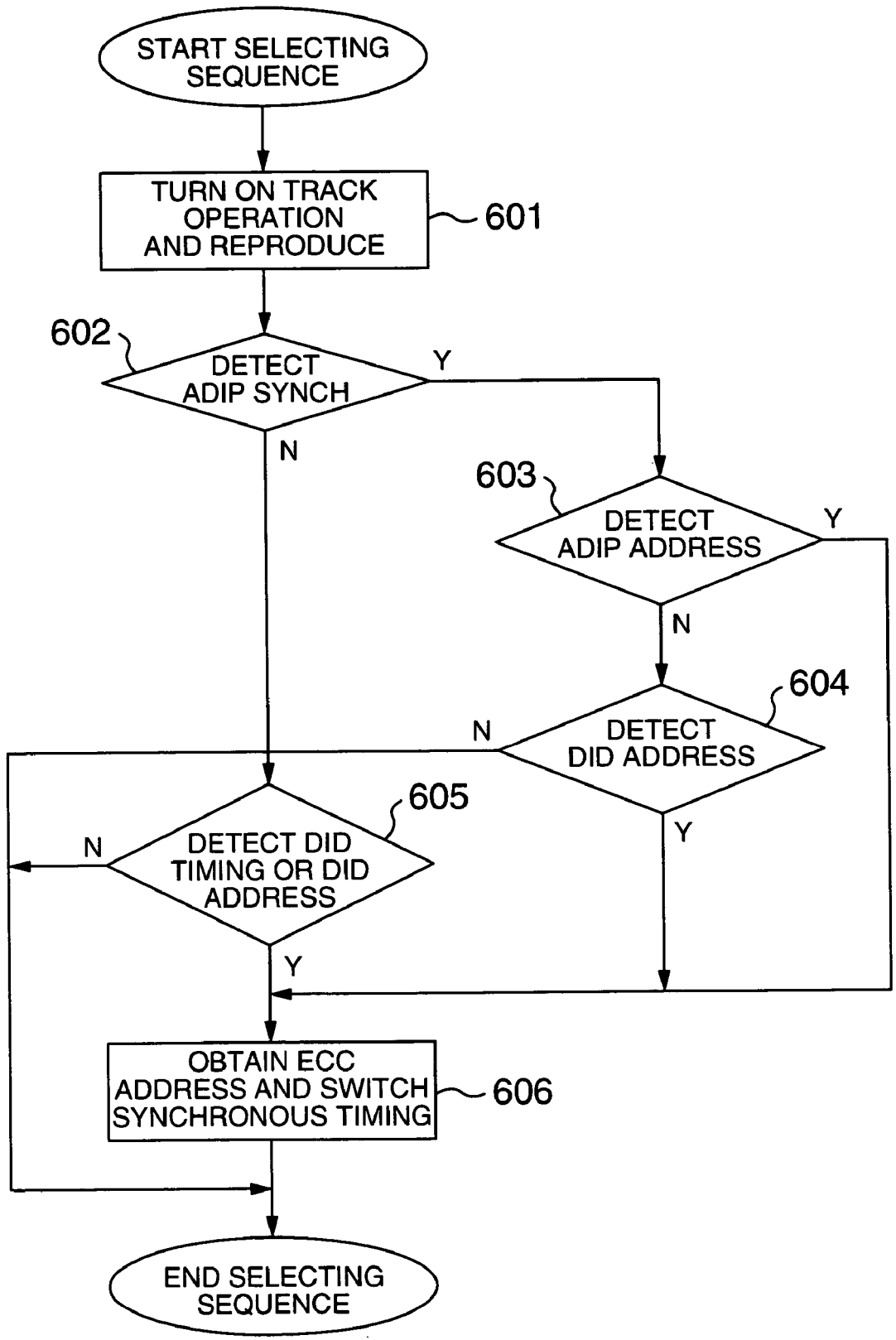
FIG. 6 is a flowchart showing the method of selecting any one of the first to the third recording methods.

In FIG. 6, when the tracking operation is switched on with respect to the optical disk 1, the process is executed to carry out the wobble reproduction and the track reproduction (step 601). In a case that in the step 601 the detection of the ADIP synch is made stable (locked) in the ADIP synch detector circuit 6, if the address detecting state (step 603) shows address detection in the ADIP address detector circuit, the first recording method is selected by controlling the selecting signals of the address selector 10 and the timing selector 11 (step 606). In a case that in the step 603 the detection of the ADIP address is not carried out or the ADIP address is not detected by restarting the tracking operation, if the address detecting state (step 604) shows address detection in the data portion ID detector circuit 9, the second recording method is selected by controlling the selecting signals of the address selector 10 and the timing selector 11 (step 606). In a case that the ADIP synch is not stably detected or no ADIP synch is detected in step 602, if, in the step 605, the detecting state of the data portion ID address value shows address detection, or the detecting state of the data portion ID detection timing or the frame synchronous signal shows timing detection, in the step 606, the third recording method is selected, and then the process of selecting the proper recording method is terminated. If it is determined that in the steps 604 and 605 no address detection and timing detection are carried out, the process is executed to retry the tracking operation or treat the area as a non-recordable area (defective area). Then, the recording process of the steps 606 to 606 is executed for another recording area on the optical disk 1.

As set forth above, according to the detecting states of the ECC address and the synchronous timing used in the recording control circuit 13, a priority is given to the first to the third recording methods when selecting one of them. In place, the disk recording apparatus may pre-select the recording method prior to selecting the tracking operation.

Figure 7:
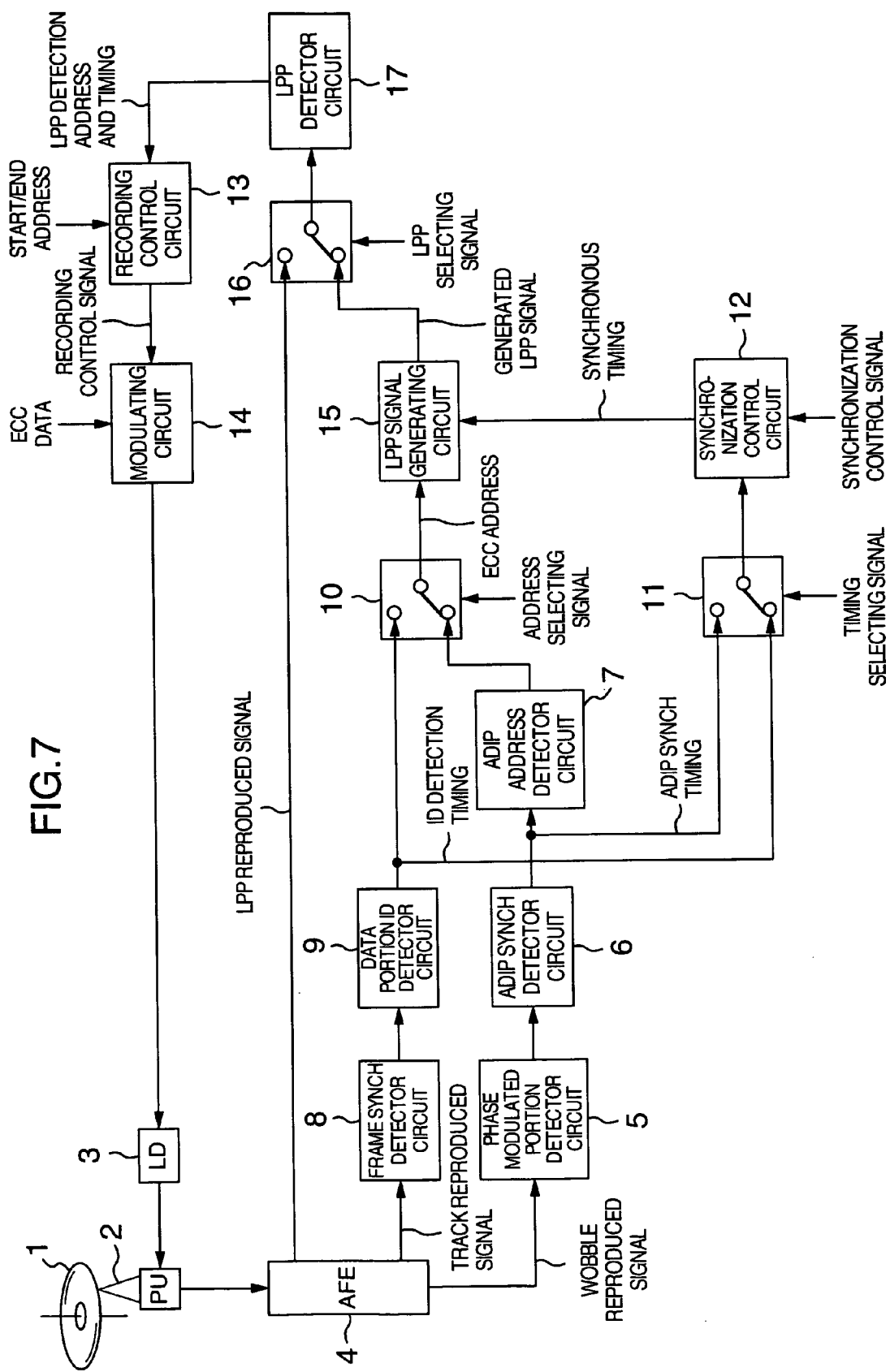
FIG. 7 is a block diagram showing a disk recording apparatus according to a second embodiment of the present invention.

FIG. 7 shows the disk recording apparatus according to the second embodiment of the invention. This disk recording apparatus is arranged to detect the ADIP address information and the ADIP synch timing from the wobble signal reproduced from the wobble PM type optical disk 1, convert them into the LPP signals according to the LPP (Land Pre-Pit) format, and control the recording operation in response to the LPP signals generated. This is intended for arranging the disk recording apparatus that enables to record data even on the disk with the wobble PM format by adding various circuits at the previous stage to the LPP signal generating circuit in the recording apparatus for the optical disk with the LPP format.

In FIG. 7, a numeral 15 denotes an LPP signal generating circuit. This circuit 15 composes LPP transfer data according to the LPP format, synchronizes the pulsewise LPP signal according to the synchronizing timing, and output the pulsewise LPP signal. A numeral 16 denotes an LPP selector. This LPP selector selects the LPP reproducing signal or the LPP signal generated in the LPP signal generating circuit 15 if the optical disk 1 has the LPP format. A numeral 17 denotes an LPP detector circuit that detects the LPP synchronous signal or the modulated address information from the LPP signal outputted from the LPP selector 16. The same components as those of the disk recording apparatus shown in FIG. 1 are not described herein.

In FIG. 7, if the optical disk 1 has the LPP format, the LPP detector circuit operates to detect the LPP synchronous signal, which is modulated into the LPP reproduced signal from the optical disk 1, and the address information. The recording control circuit 13 operates to synchronize the LPP positions on the disk with the recording timing counter, detect the recording sector of the target track according to the detection timing and the address information, and generate the recording control signal for the linking position complying with the optical disk with the LPP format.

Also in FIG. 7, if the optical disk 1 has the wobble PM format, the LPP generating circuit 15 operates to modulate the data including the ECC address from the synchronizing timing and the ECC address, which are detected from the wobble reproduced signal or the track reproduced signal of the optical disk 1, according to the LPP format, synchronize the LPP signal with the synchronizing timing, and then output the LPP signal generated. The method of selecting the synchronizing timing or the ECC address is realized by the method described with respect to the first embodiment. The generated LPP signal is treated through the LPP detector circuit 17 and the recording control circuit 13 described above, for recording the data onto the optical disk 1.

The present invention makes it possible to specify the recording target track and the linking position and realize the recording control even for the defective disk or the like.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A disk recording apparatus for recording data on an optical disk composed to have a wobble PM (Phase Modulation) format, comprising:
    means for detecting a first synchronous signal to be modulated into a reproduced wobble signal and indicating the head of a first data component unit and first address information contained in data composition;
    means for detecting a second synchronous signal to be modulated into a reproduced track signal and indicating the head of a second data component unit and second address information contained in data composition;
    first selecting means for selecting a detection timing of said first synchronous signal or a detection timing of said second synchronous signal or second address information;
    second selecting means for selecting said first or second detection address; and
    control means for specifying a linking position in synchronous to wobble positions on said disk, based on a selected detection timing sent from said first selecting means and a selected detection address sent from said selecting means and controlling a recording operation for a recording target track section.

2. A disk recording method for recording data on an optical disk composed to have a wobble PM (Phase Modulation) format, comprising the steps of:
    detecting a first synchronous signal to be modulated into a reproduced wobble signal and indicating the head of a first data component unit and first address information contained in data composition;
    detecting a second synchronous signal to be modulated into a reproduced track signal and indicating the head of a second data component unit and second address information contained in data composition;
    selecting a detection timing of said first synchronous signal or a detection timing of a second synchronous signal or second address information;
    selecting said first or second detection address; and
    specifying a linking position in synchronous to wobble positions on said disk, based on said selected detection timing and said selected detection address, for recording data onto a recording target track sector.

3. A disk recording method as claimed in claim 2, wherein said selected detection timing and said selected detection address is any one of a first combination of said first synchronous signal and said first address information, a second combination of said first synchronous signal and said second address information, and a third combination of the detection timing of said second synchronous signal or said second address information and said second address information, and
    the process is executed to specify a linking position in synchronous to wobble positions on said disk, based on the selected one of said first, second and third combinations and thereby control a recording operation for a recording target track sector.

4. A disk recording method as claimed in claim 3, wherein the selection of said first, second and third combinations, said first combination is selected if said first synchronous signal is detected and said first address information is detected, said second combination is selected if said first synchronous signal is detected and only said second address information is selected, and said third combination is selected if no first synchronous signal is detected and said second address information is detected.

* * * * *